3,260,775
METHOD FOR MAKING CONTAINER LID FITTING

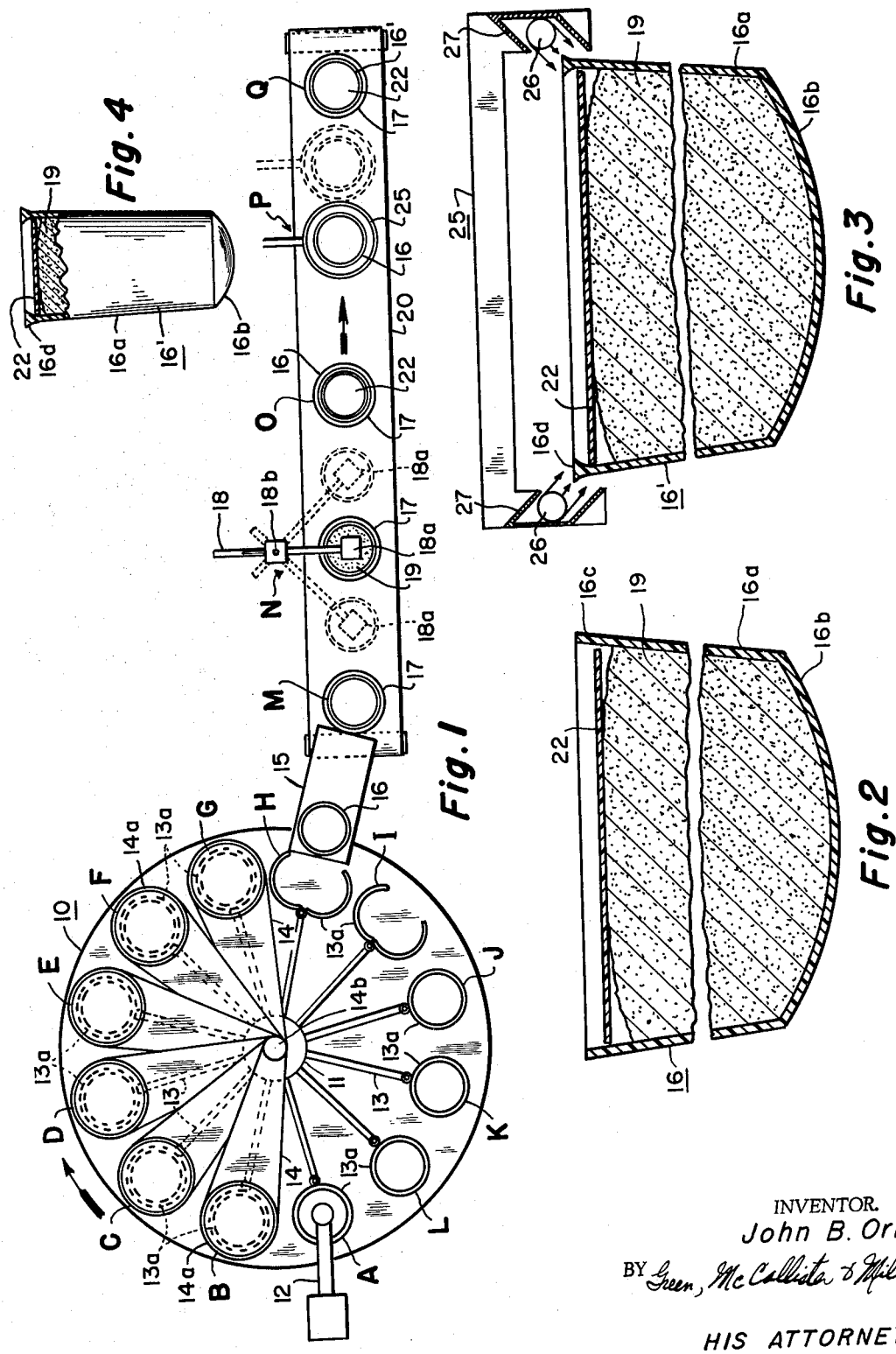

John B. Orr, Great Barrington, Mass., assignor to Sheffield Plastics, Inc., Sheffield, Mass., a corporation of Massachusetts
Filed Sept. 18, 1962, Ser. No. 224,386
6 Claims. (Cl. 264—94)

This invention relates to providing a securely fitted lid for an open mouth resin container and particularly, to an improved fitted relationship between the open mouth of a container and its lid.

A phase of the invention relates to procedure for providing an improved fitted relationship, fitting or assembling between the lip of the mouth of a resin container and a lid therefor.

Heretofore difficulty has been encountered in providing a satisfactory lid mounting for open-mouth expanded resin containers, such as of polystyrene. I have produced such containers with exterior threads about the open mouth to which are applied metal screw-on lids. However, I have determined that a container having a screw thread at its mouth must have a minimum wall thickness of about ¼ inch to withstand the forces applied when screwing on the lid. In addition, lids of this type cost as much as the containers and place containers of this type in a disadvantageous price category with respect to those made of cardboard.

I have endeavored to make a vacuum-formed closure or lid for a standard resin container which has a raised lip around the periphery of the lid; I had hoped the lid fit sufficiently snugly against the inside wall of the container to form a satisfactory closure. However, I discovered that when a container is filled with a suitable material, such as cold cream, powder, etc., and the closure or lid is pressed into place, that it will pop out of position if the container is dropped on the floor, thus spilling its content.

I have also tried molding containers with an undercut groove on the inside into which edges of the closure can be fitted in the hope that this would prevent popping out. I have found that the depth of an undercut groove is limited to a maximum of about ½₂ of an inch from the standpoint of enabling the container to be removed from the male portions of a mold used in forming it. Such a ½₂ inch depth has proved insufficient to prevent popping out. In addition, I desire to produce containers by blow molding rather than steam molding and I know of no way to make such an undercut while blow molding the container, since no male mold portion can be used in a blow molding process.

A further problem arises in blow molding resin containers from expanded bead resin materials such as of polystyrene, in that difficulty has been encountered in controlling the wall thickness within close tolerances. For example, the wall thickness of a 16 ounce container may vary from about .035 to .075 of an inch at the mouth. It is thus readily apparent that it is impossible to force-fit a closure into such a container with a tight enough fit to prevent the lid from popping out when the container is dropped.

In accordance with my invention, I am now able to develop an inexpensive procedure for making a fitting or sealing closure with respect to a container, such that the closure or lid cannot be removed after the container has been filled and without the need for employing threads.

It has thus been an object of my invention to develop a method for making a new and improved type of fitting or fitted relationship between an open mouth container and a lid or closure, and to meet the factors and solve the problem heretofore encountered in providing a non-threaded fitting for a resin container;

Another object of my invention has been to develop a simple and inexpensive procedure utilizing a resin container which involves filling it, loosely inserting a lid within its mouth, and then positively sealing or fitting the lid in position within its open mouth;

A further object of my invention has been to develop a method for producing an improved and more efficient as well as an inexpensive type of fitting for an open mouth expanded resin container of a type such that a container of this type may successfully compete in price with cardboard containers;

A still further object of my invention has been to provide a method for producing a lid mounting for a resin container which will, when mounted in position, retain a securely mounted and sealed relationship when the container with its contents is dropped on the floor.

These and other objects of my invention will appear to those skilled in the art from the illustrated and described embodiment thereof.

In the drawings, FIGURE 1 is a schematic plan view, somewhat diagrammatically illustrating apparatus and step by step procedure for producing containers, filling them and capping them in accordance with my invention;

FIGURE 2 is a side and partially broken away section in elevation through a container of my construction which has been filled with suitable material to be dispensed and within whose open mouth a lid or closure has been preliminarily relatively loosely inserted;

FIGURE 3 is a view on the same scale and similar to FIGURE 2 illustrating a final step in securing and sealing a lid or closure with respect to and within the open mouth of the resin container. This figure shows heating means employed in accordance with my invention; and FIGURE 4 is a reduced side view in elevation and partial section showing a completed container assembly produced in accordance with my invention.

Referring particularly to FIGURE 1 of the drawings, I have illustrated a typical apparatus lay-out for carrying out my invention. A rotating table 10 is mounted on a rotating shaft 11 and carries a plurality of partible or hinged, outer-wall-forming molds 13a. It will be noted that each mold 13a is supported by an arm 13 that projects outwardly from the rotating shaft 11, so that each mold 13a moves with the table 10 during its rotation.

Melted charges or gobs of resin material are fed by a suitable feeder 12 at station A into each closed mold 13a and is then blow-formed, at such representative stations as B to F, by the use of a blow head 14a in a top-fitted relation over the mold. If desired, suitable heating means may be applied to the closed molds during the blow-forming operation. Each blow head 14a is supported by an arm 14 which is mounted on a concentric inner shaft 14b for raising and lowering movement with respect to the table 10. I have only illustrated the blow heads 14a at stations B to G for simplicity of illustration; at such stations the blow heads are in a "down" or blowing position. At stations H to A, the blow heads are in an "up" or raised, non-cooperating position on their shaft 14b and are thus not shown.

Resin containers are thus successively blow-formed from charges delivered by the feeder 12 at station A to provide a preliminary container or parison 16 at station G. In moving from station G to station H, the mold assembly 13a is opened to deliver the container 16 to a forwardly-downwardly-inclined chute 15 which in turn delivers it on a positioning ring 17 of a continuously but slowly moving belt conveyor 20 at station M. At station N, a feed means 18 is employed to fill the open mouth of the container with the desired material 19 such as cleansing powder, cold cream, etc., through a feeder head 18a. The feed means 18 has a slotted pivot mounting 18b, so that the container 16 may be filled during its movement from the left-hand dotted position through the full line central position and the right-hand dotted position of station N.

At station O, a relatively rigid or shape-retaining lid or closure 22 is then laid on top of the material 19 in a manner indicated in FIGURE 2. It will be noted that the lid or closure 22 employed in accordance with my invention does not have to have a tight fit about its periphery with the inner wall or periphery of the container 16, but may have a relatively loose fit when inserted.

After the filled container 16 has left station O and has moved to station P, a suitable heating means, such as radiant heater unit 25, cooperates therewith and moves with the container to the right-hand dotted position to effect the operation shown in FIGURE 3. At station Q, the side wall area adjacent the lip edge of the container is cooled or solidified and the completed container assembly 16' is then ready for delivery to a storage or delivery area in the plant. As a result, a completed container or article 16' with a tight, sealed-on lid or closure 22 is attained, as illustrated in FIGURE 4 of the drawings. It will be noted that the preliminary container 16 and the completed container 16' are shown as having circular side walls that slightly slope or converge inwardly towards their wall ends, and that such (material-dispensing) wall ends are of rounded, convex outer contour.

From the above general description of the illustrated procedure and apparatus, it will be seen that I employ a closure or lid 22 which may be in the form of a flat disc. This disc may be press-formed from a suitable resin, such as polystyrene, or may be of a cardboard material. As explained above, the lid 22 need fit only by inserting loosely within the mouth of the expanded resin container 16 to rest in an abutting relation with the top surface of the material 19. Heat is applied about a localized side wall or lip or rim area or portion 16c of the open mouth of the container by suitable heating means, such as a radiant heater unit 25.

The unit 25, as illustrated in FIGURE 3, employs a radiant-heat-producing light tube 26 of annular shape or a series of individual heating light bulbs that are positioned within a downwardly-inwardly-inclined reflector 27 carried by the unit. As noted from the arrows in FIGURE 3, the heat is concentrated about lip or rim area portion 16c to cause the resin material to expand and thicken its walls to make the lid or closure 22 fit snugly within, lock and seal-off the mouth and, at the same time, produce a retaining ledge, ridge or annular rim flange 16d of reduced interior diameter of a suitable thickness and strength which will prevent the closure 22 from popping out when the container 16' is dropped on the floor or otherwise subjected to rough handling. It will be noted that the rim area portion 16c, previously of substantially uniform diameter with respect to the side wall of the container 16, is expanded or shaped by the operation of FIGURE 3 into a retaining ridge or shoulder portion 16d of thickened section that provides a downward wedging action along its inner periphery on the lid 22 to securely hold the lid underside in tight abutment with the material 19 as well as its outer peripheral edge in tight sealing abutment with the inner wall of the finished container 16'. The retaining portion 16d, when cooled or solidified, in effect, automatically locks the lid 22 in position; it has somewhat of a keystone shape, in that its inner surface inclines radially-inwardly toward the lip edge and its surface slightly inclines radially-outward from the side wall of the container toward its lip edge. Both the upper surface of the material 19 and the slight inward shape of the side wall which has been reduced in diameter adjacent the peripheral edge of the lid 22 by the heating action, aid in limiting the inward positioning of the lid within the container.

I have found that the concentrated application of a relatively small amount of heat that will increase the temperature of the lip portion 16c of an expanded resin container to about 260° F. will effect an expansion of the wall thickness of the lip portion 16c to form a retaining ledge portion 16d, involving an increase in diameter of the portion 16c of, for example, from about .050 inch to about .150 inch in cross sectional thickness, depending on how long the heat is applied. The illustrated expansion of thickness is represented by a period of application of a temperature of 260° F. for about one minute. If desired, as shown in FIGURE 2, the lip portion 16c may have a slightly greater length extent than desired for the ledge 16d so as to provide additional material for forming the ledge. This is particularly advantageous if the ledge is being formed from a non-expandable resin material. However, with a container formed of expanded resin beads, such as of polystyrene, I have found that this is not necessary in producing a ledge 16d.

I have found that a further advantage of the localized application of heat is that the expanded resin becomes harder and more rigid to thus increase the strength of the fitting or ledge portion 16d for the lid or closure 22. I have also discovered, and this is particularly true of a blow molded material, that the thickening of the wall takes place interiorly to decrease or pull-in the inside diameter more than to increase its outside diameter, as illustrated in FIGURE 3. This is highly important and advantageous and is believed to be caused by the memory characteristic of the resin, since it is formed from a gob of small diameter which is expanded by the blowing operation.

What I claim is:

1. A method of making a closure for an open-mouth resin container which comprises, filling the container with a suitable material substantially up to but in a spaced relation below a lip edge of the open mouth thereof, placing a lid loosely within the open mouth to rest within the container with its underside on the material, and then while employing the material to support the lid in position within the container, locally heating the wall area of resin container between the lid and the lip edge and without the application of an external deforming pressure to and without confining the wall area, forming an interiorly-projecting retaining ridge from the lip edge of increased thickness above the lid to securely lock the lid in position with respect to the container.

2. A method of effecting a closure for an open-mouth container of heat-expandable resin material which will stay closed when the container is dropped or subjected to rough handling which comprises, providing a container of resin material having a bottom wall and side walls defining a material-receiving cavity therein and whose side wall terminates at one end in an open mouth through which material may be introduced into its cavity, substantially filling the cavity of the container with a suitable material through the open mouth thereof substantially up to but in a spaced relation below a lip edge of its open mouth, introducing a closure lid through the open mouth within the side wall to rest on its underside upon the material; and while employing the material to support the lid in position within the container, applying sufficient heat to a side wall area adjacent the open mouth and the lip edge to expand the resin material and thicken and inwardly-extend the resin material along the side wall area from the lip edge to the inner peripheral edge of the closure lid, without the application of an external deforming pressure to and without confining the side wall area forming a shoulder from the side wall area that extends radially-inwardly and has an increased thickness upwardly towards the lip edge, and securely locking the closure lid in position on the material and within the container by the shoulder thus-formed.

3. A continuous method of providing a progression of filled and closed-off container assemblies which comprises, successively blow-forming open-mouth resin containers from expanded resin material, successively filling each container with a suitable material up to but below a lip edge of the open mouth thereof, successively somewhat loosely placing a closure lid within the open mouth of each container to rest on its underside upon the material; and while employing the material to support the lid in position within the container, successively applying a localized heat about the open mouth wall area of each container to expand the resin material in such localized wall area, without the application of an external deforming pressure and without confining to the localized wall area thickening the resin material in such heated localized wall area and inwardly-deforming it from the closure lid toward the lip edge, and cooling the heated localized wall area to securely seal and lock the closure lid in position within the container and upon the material contained therein.

4. A method as defined in claim 1 wherein, the container is mold-formed of resin material in such a manner as to impart a memory characteristic to the wall area, and the radial-inward deforming of the wall area is effected by heating it to a substantially plastic condition such that its memory characteristic will contribute to a radial-inward deforming of the wall area and the forming of the retaining ridge, and the heating is withdrawn when the wall area has attained a sufficient inward deformation and thickening.

5. A continuos method of providing a progression of filled and closed-off container assemblies which comprises, successively blow-forming open mouth resin containers from expanded resin material at a forming station, advancing each successively formed container from the forming station and while holding it in an upright position in which its open mouth extends upwardly, successively and continuously advancing each container past a filling station, a lid inserting station and a lid sealing station; at the filling station successively filling each container through the open mouth thereof with a suitable material up to but in a spaced relation below the lip edge of the container, at the lid inserting station successively loosely-placing a closure lid within the open mouth of each container to rest on its underside in a supported position upon the material; at the lid sealing station successively applying radiant heat to a localized wall area about the open mouth of each container and further expanding the resin material thereabout and without the application of an external deforming pressure to and without confining the localized wall area, and thickening the localized wall area radially-inwardly-upwardly from the closure lid to the lip edge to seal the lid in position upon the material in each container.

6. A method of making a filled resin container assembly which comprises, mold-forming resin material into a container body having a rounded side wall of substantially uniform thickness that declines inwardly towards and terminates at one end in a bottom end wall and terminates at its other end in an open-mouth portion with a lip edge thereabout, filling the container with a suitable material to be dispensed substantially up to but in a spaced relation below the lip edge of its open mouth portion, relatively loosely introducing a disc-shaped lid to rest on its under side upon the material within the container; and employing the material to support the lid in position within the container, while heat-expansion-forming a localized wall area of the container between the lip edge and the lid into an enlarged substantially keystone shape without the application of an external deforming pressure to and without confining the localized wall area, and deforming the wall area of keystone shape radially-inwardly above the outer side of the lid to lock the lid in place on the material and within the container.

References Cited by the Examiner

UNITED STATES PATENTS

| 2,431,238 | 11/1947 | Friedman. | |
| 2,515,669 | 7/1950 | Scholl | 264—249 |
| 2,678,471 | 5/1954 | Barton | 18—59 |
| 2,775,383 | 12/1956 | Kollman et al. | 206—46 |
| 2,880,859 | 4/1959 | Tupper | 206—46 |
| 3,044,611 | 7/1962 | Tupper | 206—46 |
| 3,087,823 | 4/1963 | Hein et al. | |
| 3,122,274 | 2/1964 | Quinche | 264—249 |

FOREIGN PATENTS

| 78,075 | 9/1954 | Denmark. |

ROBERT F. WHITE, *Primary Examiner.*

EARLE J. DRUMMOND, ALFRED L. LEAVITT,
*Examiners.*

T. J. CARVIS, *Assistant Examiner.*